United States Patent
Hyseni (10) Patent No.: US 11,009,002 B2
(45) Date of Patent: May 18, 2021

(54) POWER TOWER

(71) Applicant: Kujtim Hyseni, Halmstad (SE)

(72) Inventor: Kujtim Hyseni, Halmstad (SE)

(*) Notice: Subject to any disclaimer, the term of this patent is extended or adjusted under 35 U.S.C. 154(b) by 71 days.

(21) Appl. No.: 16/465,659

(22) PCT Filed: Dec. 1, 2017

(86) PCT No.: PCT/EP2017/081188
§ 371 (c)(1),
(2) Date: May 31, 2019

(87) PCT Pub. No.: WO2018/100158
PCT Pub. Date: Jun. 7, 2018

(65) Prior Publication Data
US 2019/0316563 A1 Oct. 17, 2019

(30) Foreign Application Priority Data
Dec. 2, 2016 (EP) .................................... 16201951

(51) Int. Cl.
*F03D 1/04* (2006.01)
*F03D 9/35* (2016.01)
(Continued)

(52) U.S. Cl.
CPC ................ *F03D 1/04* (2013.01); *F03D 9/00* (2013.01); *F03D 9/007* (2013.01); *F03D 9/35* (2016.05); *F03D 9/37* (2016.05); *F03G 6/04* (2013.01)

(58) Field of Classification Search
CPC ... F03D 1/04; F03D 9/007; F03D 9/35; F03D 9/37; F03D 9/00; F05B 2240/131;
(Continued)

(56) References Cited

U.S. PATENT DOCUMENTS 4,122,675 A * 10/1978 Polyak ...................... F03D 9/25
327/28
4,306,416 A * 12/1981 Iozzi ..................... F01K 27/005
60/641.11
(Continued)

FOREIGN PATENT DOCUMENTS

EP 2083169 A1 * 7/2009 ............ F03G 6/045
GB 2081390 A 2/1982
(Continued)

OTHER PUBLICATIONS

International Search Report (PCT/ISA/210) and Written Opinion (PCT/ISA/237) dated Feb. 12, 2018, by the European Patent Office as the International Searching Authority for International Application No. PCT/EP2017/081188.

*Primary Examiner* — Brian P Wolcott
(74) *Attorney, Agent, or Firm* — Buchanan Ingersoll & Rooney P.C.

(57) ABSTRACT

A renewable-energy power plant including a first structure, a second structure, a first flue, a second flue and a turbine arrangement comprising at least one turbine, wherein the first structure includes a primary fluid inlet and the second structure includes a secondary fluid inlet and a primary fluid outlet, wherein the secondary fluid inlet is connected to the first flue, wherein the primary fluid inlet is located lower than the secondary fluid inlet and the primary fluid outlet is located lower than the secondary fluid inlet, wherein the turbine arrangement is provided inside the second flue, wherein the power plant includes wetting means arranged to discharge an additive fluid to the working fluid passing through the secondary fluid inlet, wherein the turbine arrangement is arranged to generate power due to the working fluid flowing in a downwards direction inside the second flue and passing through the turbine arrangement.

12 Claims, 3 Drawing Sheets

(51) Int. Cl.
*F03D 9/37* (2016.01)
*F03D 9/00* (2016.01)
*F03G 6/04* (2006.01)

(58) Field of Classification Search
CPC .......... F05B 2240/133; F05B 2240/912; F05B 2250/231; F05B 2260/212; F05B 2260/24; F03G 6/04; F03G 6/045; Y02E 10/72; Y02E 10/728; Y02E 10/46
See application file for complete search history.

(56) References Cited

U.S. PATENT DOCUMENTS

| | | | | |
|---|---|---|---|---|
| 4,452,046 A | * | 6/1984 | Valentin | F03D 9/39 60/641.11 |
| 5,284,628 A | * | 2/1994 | Prueitt | F03G 6/045 422/168 |
| 5,300,817 A | * | 4/1994 | Baird | F03D 9/007 290/55 |
| 6,681,576 B1 | * | 1/2004 | Abe | F28F 1/14 60/643 |
| 7,821,151 B2 | * | 10/2010 | Le | F03G 6/045 290/55 |
| 8,517,662 B2 | * | 8/2013 | John | F03D 1/04 415/1 |
| 8,727,698 B1 | * | 5/2014 | Pickett | F03D 9/37 415/1 |
| 9,638,170 B2 | * | 5/2017 | Lee | H02K 7/183 |
| 2009/0152370 A1 | * | 6/2009 | Pesochinsky | F03G 6/045 239/2.1 |
| 2010/0275598 A1 | * | 11/2010 | Raffaele | F02C 1/05 60/641.8 |
| 2012/0261918 A1 | * | 10/2012 | Hanback | F03D 1/04 290/44 |
| 2016/0047360 A1 | * | 2/2016 | Fex, Jr. | F24F 7/04 415/1 |

FOREIGN PATENT DOCUMENTS

| | | | | |
|---|---|---|---|---|
| WO | | 2009059959 A2 | 5/2009 | |
| WO | | WO-2009059959 A2 | * 5/2009 | ............... F03G 7/04 |

* cited by examiner

POWER TOWER

FIELD OF THE INVENTION

The present invention relates to a renewable-energy power plant arranged to generate power due to a working fluid flowing in a downwards direction inside a flue and passing through a turbine arrangement.

BACKGROUND

In recent years, several alternative energy sources have been proposed to decrease our reliance on fossil fuels. Such alternative energy sources include solar energy, wave power, tidal power and wind power. A problem with the alternative land based energy sources, namely solar power and wind power, is that they require large amounts of land area in order to provide significant amounts of energy. Conventional power plants such as a coal power plant or a nuclear power plant are much more space efficient in their energy generation, thus providing a clear benefit over the alternative energy sources listed above.

Two other types of alternative energy sources recently proposed are a so-called solar updraft tower and a so-called downdraft energy tower. The solar updraft tower utilizes a solar energy to heat air which then rises in a chimney-like structure due to the conventional chimney effect. The structure is then provided with means to generate energy from this updraft. Often, the solar updraft tower includes a radially extending greenhouse-like structure arranged to increase the temperature of the air surrounding the inlet of the solar updraft tower. This is to increase the efficiency of the energy generation by increasing the temperature of the ambient air. A problem with this solution is that its uptake area, due to the inclusion of the greenhouse-like structure, is very large. The downdraft energy tower is a chimney-like structure provided with a sprinkler system at the top of the tower. The energy generation of this downdraft energy tower is based on the principle that by spraying water on hot air, the hot air can be caused to cool off while simultaneously taking up some of the water that is sprayed onto it. Thus, the density of the air just below the sprinklers is increased, such that a downdraft is created. Means for energy generation are then placed in an outlet of the chimney-like structure, thus allowing energy to be generated. A problem with this technology is that a very hot and arid climate is required in order for the air in connection with the sprinklers to be sufficiently hot and dry. Also, the downdraft energy tower is limited in how high it can be due to the fact that the temperature of the ambient air generally decreases the further from the ground you go. At 1 km altitude, the temperature is generally about 6.5° C. lower than at the ground. At very high altitudes, the temperature is therefore so low so that efficient use of the downdraft energy tower is impossible.

Thus, it would be beneficial to provide an alternative energy source which is renewable, space efficient, and possible to scale up so that large scale energy production is achieved.

SUMMARY OF THE INVENTION

An object of the present invention is therefore to alleviate the abovementioned problems and provide a renewable-energy power plant that is space efficient and possible to scale up so that large scale energy production is achieved. Such a renewable-energy power plant is unexpectedly achieved by combining the principles of the solar updraft tower and the downdraft energy tower. The above and other objects which will be evident from the following description are thus achieved by a renewable-energy power plant according to the present invention.

According to a first aspect of the present invention, a renewable-energy power plant is provided, said renewable-energy power plant comprising a first structure, a second structure, a first flue, a second flue and a turbine arrangement comprising at least one turbine, wherein said first structure comprises a primary fluid inlet and said second structure comprises a secondary fluid inlet and a primary fluid outlet, wherein said secondary fluid inlet is connected to said first flue, wherein said primary fluid inlet is located lower than said secondary fluid inlet and said primary fluid outlet is located lower than said secondary fluid inlet, wherein said first flue is at least partly defined by said first structure, wherein said second flue is at least partly defined by said second structure, wherein said first flue extends from said primary fluid inlet to said secondary fluid inlet for guiding a working fluid from said primary fluid inlet to said secondary fluid inlet, wherein said second flue extends from said secondary fluid inlet to said primary fluid outlet for guiding said working fluid from said secondary fluid inlet to said primary fluid outlet, wherein said second flue has a cross-sectional area that decreases from an upper portion of said second flue towards an intermediate portion of said second flue, and wherein said cross-sectional area of said second flue increases from said intermediate portion of said second flue towards a lower portion of said second flue, wherein said second flue comprises at least one tertiary fluid inlet located adjacent to said intermediate portion of said second flue, wherein said at least one tertiary fluid inlet is arranged to allow a fluid to enter said second flue from outside said first structure, wherein said turbine arrangement is provided inside said second flue, wherein said power plant further comprises wetting means arranged to discharge an additive fluid to said working fluid passing through said secondary fluid inlet, wherein said additive fluid has a higher density than said working fluid, wherein said turbine arrangement is arranged to generate power due to said working fluid flowing in a downwards direction inside said second flue and passing through said turbine arrangement.

It is to be understood that the working fluid is guided by the first flue from the primary fluid inlet to the secondary fluid inlet. As opposed to the downdraft energy tower described above, the secondary fluid inlet of the present invention is not required to take the working fluid from the ambient atmosphere, but can instead take the working fluid from inside the first flue. The temperature difference of the air in the ambient atmosphere may significant between a height of the primary fluid inlet and a height of the secondary fluid inlet, especially if the height difference is more than 400 m. At the altitude of the secondary fluid inlet, the ambient atmosphere may be significantly colder than at the altitude of the primary fluid inlet. Therefore, by having the secondary fluid inlet connected to the first flue, the working fluid that reaches the wetting means is of a higher temperature than what would have been possible had the secondary fluid inlet been connected to ambient atmosphere. This is beneficial as it increases the efficiency of the wetting means, allowing the wetting means to more efficiently cause the working fluid to flow in a downward direction through the second flue. This increase in wetting efficiency is due to the fact that the hotter the working fluid is, the more additive fluid it can hold before it becomes saturated. It is to be understood that as the working fluid is guided through the first flue, it is simultaneously heated by any external source of radiant heat, such as the sun. As such, the working fluid at the secondary fluid inlet is not only of a higher temperature than the ambient atmosphere at a corresponding altitude, but also of higher temperature than the working fluid at the primary fluid inlet.

The wetting means may be a sprinkler system arranged to discharge the additive fluid at least partly into the second flue. By having the power plant comprise the wetting means, a wetting zone is created adjacent to the second fluid inlet. This wetting zone allows the working fluid to be mixed with the additive fluid in such a way so that a density of the working fluid increases as it is wetted. Thus, the additive fluid in the wetting zone will rapidly fall down through the second flue. When the working fluid falls downwards from the wetting zone and into the second flue, the working fluid in the first flue replaces the falling fluid in the wetting zone and the process of wetting and falling continues.

The additive fluid may have a lower temperature than the working fluid. By providing an additive fluid that has a lower temperature than the working fluid, a wetting and cooling zone is created. Cooling the working fluid causes its density to increase. A wetting zone and/or a cooling and wetting zone is thereby achieved adjacent to the wetting means. Cooling and wetting the working fluid causes its density to increase even further, thus increasing the efficiency of the renewable-energy power plant.

According to one exemplary embodiment of the present invention, the additive fluid is an additive liquid. Thus, the density of the working fluid increases even further after passing the wetting means. Thereby, a greater efficiency of the energy generation of the renewable-energy power plant is achieved.

The first flue may have a primary portion that extends from the first fluid inlet in an upward direction. The cross-sectional area of the primary portion of the first flue may be substantially constant. Thus, frictional losses are decreased. The first flue may further comprise a secondary constricted portion and/or a tertiary top portion. By having a constricted portion, the velocity of the working fluid is increased locally.

According to one exemplary embodiment of the present invention, the power plant further comprises a roof structure, and wherein a tertiary top portion of the first flue is defined by the first structure and the roof structure, and wherein the secondary fluid inlet is connected to the tertiary top portion of the first flue. Thus, a space is created in which the working fluid is guided from the first flue to the secondary fluid inlet, while the working fluid is separated from ambient air. By separating the working fluid from the ambient air, the risk of temperature losses of the working fluid due to mixing with ambient air (which at the altitude of the secondary fluid inlet is significantly lower than the working fluid) is decreased.

According to one example embodiment said second flue may have a cross-sectional area that decreases from an upper portion of said second flue towards an intermediate portion of said second flue, and wherein said cross-sectional area of said second flue increases from said intermediate portion of said second flue towards a lower portion of said second flue. The second flue may for example comprise an outer wall and an inner wall, wherein the outer wall is shaped as a cylinder and the inner wall defines a constricted section of the second flue. The constricted section could for example be a Venturi tube, an hourglass-shaped flue, or a de Laval nozzle. Thus, the velocity of the working fluid is greatly increased in this portion of the second flue.

According to one exemplary embodiment, said second flue comprises at least one tertiary fluid inlet located adjacent to said intermediate portion of said second flue, wherein said at least one tertiary fluid inlet is arranged to allow a fluid to enter said second flue from outside said first structure. This is to be understood as meaning that a fluid may enter the second flue from outside the first structure due to the under-pressure which is created inside the constricted portion of the second flue when a fluid flows therethrough. The under-pressure in the constricted portion is created due to an increased fluid velocity therein, as is explained by the Bernoulli principle.

At least part of said first flue may be collectively defined by said first structure and said second structure. According to one exemplary embodiment, the second structure is arranged inside the first structure. As such, the outer walls of the second structure and the inner walls of the first structure collectively define at least part of the first flue. This provides an increased space efficiency of the renewable-energy power plant. However, in other embodiments, the first and second structure may be arranged adjacent to each other.

Said first structure may be substantially shaped as a vertically oriented cylinder and a longitudinal axis of said second flue may be substantially parallel with the gravitational direction. Thus, pressure loss due to the viscosity of the working fluid is minimized as any contact in a vertical direction between the inner walls of the second structure and the working fluid is minimized.

Said turbine arrangement may be provided adjacent to said primary fluid outlet. The turbine arrangement may comprise a plurality of turbines. By having the turbine arrangement comprise a plurality of turbines, several benefits are achieved, wherein said benefits include the renewable-energy power plant being less reliant on the constant up-time of each individual turbine in order to produce energy. Said benefits also include an increased efficiency of the power generation. Also, having more turbines reduces the requirements on each individual turbine, allowing more simple, less costly, lower capacity and smaller turbines to be used. This reduces the cost of the renewable-energy power plant. The turbine arrangement may comprise a plurality of turbine groups, wherein each turbine group comprises a number of turbines arranged in a sequential manner in a respective portion of the primary fluid outlet. By having sequentially arranged turbines, the efficiency of the power generation is increased.

According to one exemplary embodiment, said primary fluid inlet is connected to ambient atmosphere. The ambient atmosphere that the primary fluid inlet may be connected to is to be understood as being significantly closer to the ground than the uppermost portion of the renewable-energy power plant. Thus, the air at the primary fluid inlet is generally of higher temperature than that which is located at an altitude corresponding to the position of the secondary fluid inlet. The primary fluid inlet may be connected to a second power plant producing an excess of hot air that is otherwise discharged into ambient atmosphere. This connection may either replace the connection of the primary fluid inlet or may be present in combination with a primary fluid inlet connected to an ambient atmosphere. For example, the primary fluid inlet could be connected to a waste disposal facility and use the flue gas therefrom as working fluid, either exclusively or in combination with an ordinary fluid inlet taking the working fluid from an ambient atmosphere. I.e., the primary fluid inlet may be connected to both ambient atmosphere and a second power plant producing flue gas.

The primary outlet may be connected to ambient atmosphere. Thus, the cool and humid air is discharged to an area surrounding the renewable-energy power plant. This may be utilized in order to control the climate surrounding the power plant, for example providing a hot and arid land area with sufficient air moisture to allow crops to be grown there.

Said wetting means may comprise a plurality of hollow tubes arranged in a concentric manner about a longitudinal axis of said second flue, and wherein said plurality of hollow tubes comprises a plurality of fluid discharging means. As such, a sprinkler system is achieved which covers a majority of the secondary fluid inlet, thus allowing a large portion of the air entering the second flue to be wetted.

According to one exemplary embodiment, said second structure comprises a fluid director located in said lower region of said second flue, wherein said fluid director is arranged to direct said working fluid from said intermediate portion of said second flue towards said primary fluid outlet. The fluid director could for example be rotationally symmetric and have a smooth curvature such that significant pressure losses are avoided. By decreasing pressure losses, either by using a fluid director as described above or by any other means discussed herein, the efficiency of the power generation is increased as the fluid velocity is kept from decreasing significantly due to pressure losses.

Said second structure may comprise means for thermal insulation of said second flue from said first flue. The means for thermal insulation could for example be vacuum panels for thermal insulation, a layer of stationary air, or any other commonly available means for thermal insulation. By insulating the second flue from the first flue, heat is prevented from being transported from the hot, rising working fluid in the first flue to the cooled, humid, falling working fluid in the second flue. If the working fluid in the second flue is heated, its density will decrease and the velocity of the downdraft created therein will decrease. Conversely, if the working fluid in the first flue is cooled, its density will increase and the velocity of the thermally driven updraft in the first flue will decrease. Having the working fluid flow at a lower velocity decreases the renewable-energy power plant's ability to generate power. According to one exemplary embodiment, the first flue and the second flue are separated by ambient air. Thus, the first flue is thermally insulated from the second flue by means of ambient air.

The height difference between said secondary fluid inlet and said primary fluid outlet may be at least 400 m, preferably at least 600 m, and most preferably at least 800 m. By having this height difference between the secondary fluid inlet and the primary fluid outlet, a greater potential for energy generation is achieved.

The ratio between the cross-sectional area of the intermediate portion of the second flue and the lower portion of the second flue may be at least 3.

According to one exemplary embodiment, the length of the intermediate portion, measured in the gravitational direction, is between 10% and 40% of the height difference between said secondary fluid inlet and said primary fluid outlet.

According to one exemplary embodiment of the present invention, the second flue has a circular cross-section. The circular cross-section may have a diameter that is between 25% and 75% of the height difference between said secondary fluid inlet and said primary fluid outlet.

According to one exemplary embodiment of the present invention, the ratio between the cross-sectional area of the first flue and the second flue is between 0.5 and 2.

According to one exemplary embodiment, an outer wall of said first structure is made of a transparent material. Examples of such transparent material include but are not limited to glass, reinforced glass, and a transparent polymer. By having the outer wall of the first structure be made of a transparent material, the first flue is allowed to be heated more efficiently by radiant heat originating from an external source, e.g. the sun. Benefits of having the working fluid in the first flue be heated are as described above.

An outer wall of said second structure may be provided with means for increasing the effectiveness of absorbing radiant heat. Such means may include a surface that has been subjected to surface treatment such that is becomes less reflective and better at absorbing radiant heat. Such means also include painting the surface in a dark color, thus increasing the surface's ability to absorb radiant heat from the sun. By having an outer wall of the second structure be provided with means increasing the effectiveness of absorbing radiant heat, the renewable-power plant is arranged to further increase the efficiency by which the first flue is heated by radiant heat originating from an external source. According to one exemplary embodiment of the present invention, the outer wall of the second structure is painted black as a means for increasing the effectiveness of absorbing radiant heat. According to one exemplary embodiment of the present invention, the outer wall of the second structure has a reflectivity such that it absorbs a majority of the light in the visible spectrum.

According to one exemplary embodiment, said renewable-energy power plant further comprises a roof structure comprising a transparent portion, wherein said roof structure and said first structure collectively defines a heating space, wherein said roof structure comprises a fourth fluid inlet connecting said heating space to ambient air, and wherein said first structure further comprises a fifth fluid inlet connecting said heating space to said first flue.

According to one exemplary embodiment, the fourth fluid inlet is a third flue connecting the heating space to ambient air, wherein the height difference between an upper end of the third flue and a lower end of the third flue is at least 400 m, preferably at least 600 m, and most preferably at least 800 m, and wherein the upper end of the third flue is the end which is connected to the heating space.

According to one exemplary embodiment, the third flue is provided with a one-way valve arranged to allow a fluid to flow in the direction from the ambient atmosphere to the heating space. Thus, the working fluid contained in the heating space is prevented from escaping through the third flue due to an overpressure created inside the heating space as a result of the working fluid being heated by an external source of radiant heat. Thus, the working fluid is forced to exit the heating space and enter the first flue through the fifth fluid inlet, thereby providing heated working fluid to a portion of the first flue that is adjacent to the wetting means. By providing the portion of the first flue which is adjacent to the wetting means with an additional source of heated working fluid, the efficiency of the renewable power plant is increased as a larger amount of working fluid is caused to flow or fall through the second flue.

A renewable-energy power plant according to any one of the preceding claims, wherein said power plant comprises a container for holding said additive fluid and said first flue comprises a constricted portion, wherein said container is connected to said constricted portion and arranged so that an under-pressure in said constricted portion causes the pressure in said container to drop. The under-pressure in the constricted portion is to be understood as occurring due to an increased fluid flow rate therein.

According to one exemplary embodiment of the present invention, the connection between the constructed portion of the first flue and the container is arranged so that the connection is fluid-tight. For example, the connection may be provided with a membrane arranged to prevent fluid from flowing from one side of the membrane to the other side, and arranged to allow an under-pressure to translate from one side of the membrane to the other side.

According to one exemplary embodiment of the present invention, the container is connected to the wetting means so that the additive fluid discharged by the wetting means is taken from the container. The under-pressure created inside the container due to the connection of the container to the constricted portion of the first flue causes the boiling point of the additive fluid held in the container to fall. As the boiling point falls, some of the additive fluid will go from a liquid form to a gaseous form. During this phase transition, or this vaporization, the system absorbs energy. As there is no form of external heating source added to the container, the energy absorbed will instead be taken from the heat of the additive fluid, thus causing the temperature of the additive fluid to drop. Thus, the under-pressure in the constricted portion of the first flue casus the temperature of the additive fluid to drop.

According to one exemplary embodiment of the present invention, the container is provided with a vapor outlet. The additive fluid that has gone from a liquid form to a gaseous form is preferably removed from the container through the vapor outlet provided thereon. Thus, the vaporized additive fluid is removed from the container. According to one exemplary embodiment of the present invention, the vapor outlet comprises a pump arranged to remove the gaseous additive fluid from the container.

According to one exemplary embodiment of the present invention, the renewable energy plant further comprises a desalination unit connected to a constricted portion of said first or of said second flue, such that an under-pressure of said constricted portion may be transferred to said desalination unit. By transferring said under-pressure to said desalination unit, salt water held therein may be caused to evaporate, thus concentrating the salinity of the water as the evaporated water is directed away from the desalination unit.

According to one exemplary embodiment, said desalination unit comprises a first chamber and a second chamber, wherein said first chamber comprises an inlet for receiving salt water, and said second chamber is connected to said first chamber and configured to allow evaporated water to be transported from the first chamber to the second chamber. Said water may be caused to evaporate by means of under-pressure transferred from said constricted portion of said first or second flue.

According to one exemplary embodiment of the present invention, said constricted portion of said second flue may be alternatingly connected to said tertiary fluid inlet and said desalination unit. Thus, a user may switch between using the under-pressure of the constricted portion to increase the mass transfer in the downward direction in the second flue, or using the under-pressure to power the desalination unit.

According to a second aspect of the present invention, a method for generating energy is provided, said method comprising the steps of:
  guiding a working fluid through a first flue extending in an upward direction, said working fluid rising therethrough due to it being heated by an external source of radiant energy,
  guiding said working fluid into a second flue once said working fluid has reached a top portion of said first flue, said second flue extending in a downward direction,
  discharging an additive fluid to said working fluid causing its temperature to decrease and its density to increase,
  guiding said working fluid through said second flue,
  transforming a portion of the kinetic energy of said working fluid to electrical energy.

The velocity of said working fluid may be caused to increase by guiding said working fluid through a portion of said second flue which has a decreased cross-sectional area, and additional working fluid may be introduced into said second flue due to an under-pressure created therein as the velocity of the working fluid is increased.

Generally, all terms used in the claims are to be interpreted according to their ordinary meaning in the technical field, unless explicitly defined otherwise herein. All references to "a/an/the [element, device, component, means, step, etc.]" are to be interpreted openly as referring to at least one instance of said element, device, component, means, step, etc., unless explicitly stated otherwise.

BRIEF DESCRIPTION OF THE DRAWINGS

The above, as well as additional objects, features and advantages of the present invention, will be better understood through the following illustrative and non-limiting detailed description of exemplary embodiments of the present invention, with reference to the appended drawing, wherein.

DETAILED DESCRIPTION OF THE DRAWINGS

In the present detailed description, embodiments of a renewable-energy power plant according to the present invention are mainly discussed with reference to drawings showing a renewable energy power plant with components and portions being relevant in relation to various embodiments of the invention. It should be noted that this by no means limits the scope of the invention, which is also applicable in other circumstances for instance with other types or variants of renewable-energy power plants than the embodiments shown in the appended drawings. Further, that specific features are mentioned in connection to an embodiment of the invention does not mean that those components cannot be used to an advantage together with other embodiments of the invention.

The invention will now by way of example be described in more detail by means of embodiments and with reference to the accompanying drawings. The meaning of any reference to the relative spatial placement "lower" or the direction "down" is to be understood by taking reference from the gravitational direction. Conversely, "upper" or "up" is to be understood as being the direction which is opposite the gravitational direction. Any reference to "outer" is to be understood as relating to a position which is located away from a center point of the renewable-energy power plant. Conversely, any reference to "inner" is to be understood as meaning a position located closer to a center of the renewable-energy power plant. Any reference herein to working fluid is to be understood as meaning air taken from an ambient atmosphere and led through the renewable-energy power plant in order to generate energy. Any reference to high altitude ambient atmosphere is to be understood as meaning the atmosphere which is external to the renewable-energy power plant and which is at a sufficiently great altitude so that the temperature of the air there is significantly lower than at ground level. Low altitude ambient atmosphere is to be understood as being the atmosphere external to the renewable-energy power plant which is substantially located at ground altitude.

Figure 1:
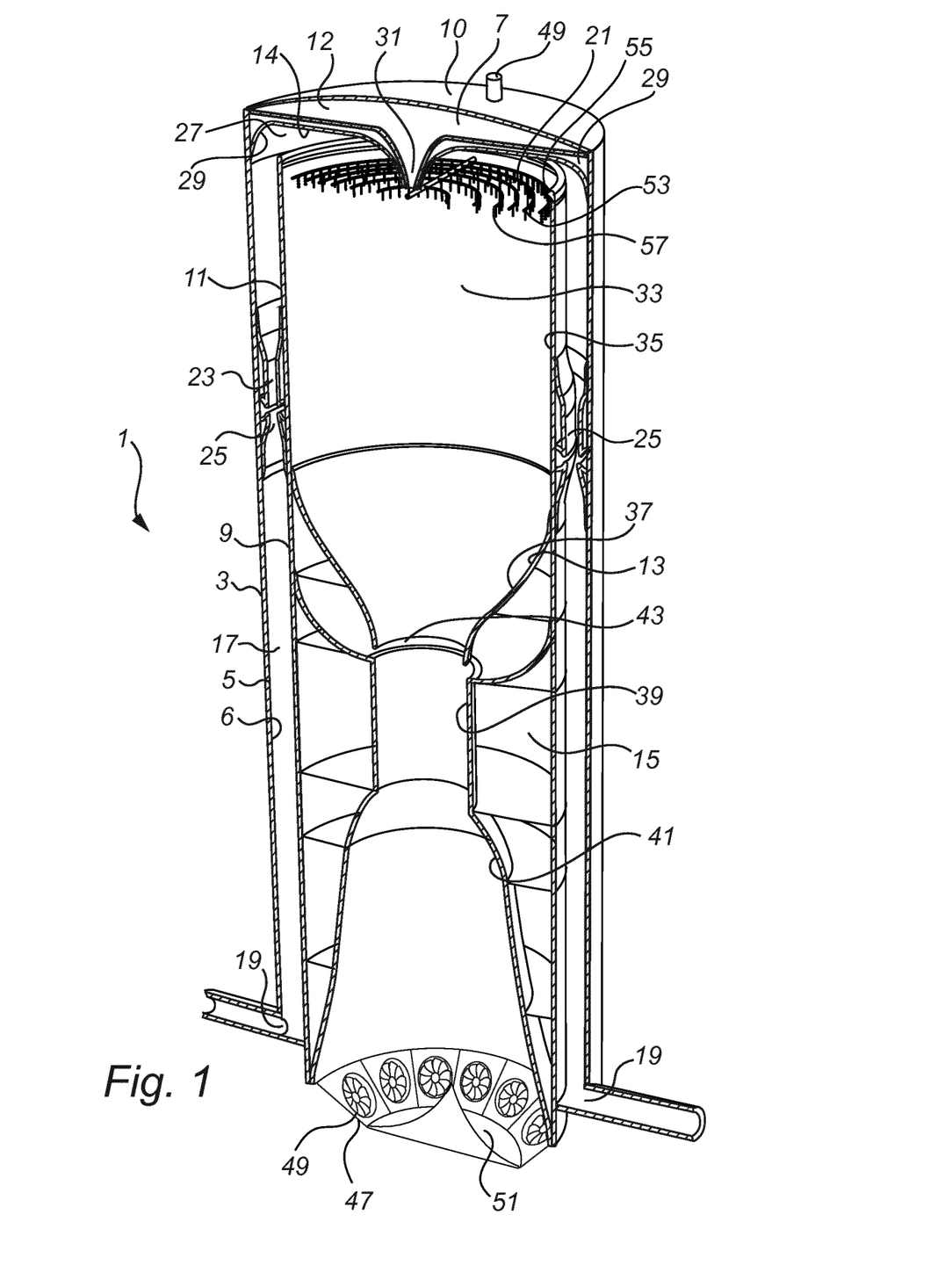
FIG. 1 is a perspective cross-sectional view of a renewable-energy power plant according to an exemplary embodiment of the present invention.

FIG. 1 is a perspective cross-sectional view of a renewable-energy power plant 1 according to an exemplary embodiment of the present invention. The renewable-energy power plant 1 comprises a first structure 3, which is shaped as a vertically oriented cylinder. The first structure 3 has an outer lateral surface 5, an inner surface 6 and a roof portion 7. Thus, the first structure 3 is shaped as a closed-top cylinder. The renewable-energy power plant 1 further comprises a second structure 9 arranged inside the first structure 3. The second structure 9 has an outer lateral surface 11 which is shaped as a vertically oriented cylinder and an hourglass shaped inner surface 13. The outer surface 11 of the second structure 9 and portion of the inner surface 13 of the second structure 9 which defines the hourglass shape are arranged such that there is an empty space 15 between them. The second structure 9 can thus be seen as an hourglass enclosed within a cylinder. The roof portion 7 comprises a convex outer surface 10 and an inner surface 14. The roof portion 7 is arranged such that a space 12 is provided between the convex surface 10 and the inner surface 14, i.e. the roof portion 7 is hollow.

The outer surface 11 of the second structure 9 and the inner surface 6 of the first structure 3 collectively define a first flue 17. I.e., the first flue 17 is a space which is provided between the first structure 3 and the second structure 9. The first flue 17 is a channel or passage in which a fluid (e.g. air) can be transported. Specifically, the first flue 17 is arranged to allow air that has been heated by the sun to rise inside the first flue. The first flue 17 has an annular shape and extends from the lower portion to the upper portion of the first structure 3 and the second structure 9, respectively. The first flue 17 comprises a constricted portion 23 defined by protrusions 25 extending from the inner surface 6 of the first structure 3 and from the outer surface 11 of the second structure 9. The constricted portion 23 is configured so that the cross-sectional area of the first flue 17 decreases locally over the constricted portion 23.

The first structure 3 further comprises two primary fluid inlets 19 located adjacent to a lower portion of the first structure 3 and which are arranged to connect the first flue 17 to the low altitude ambient atmosphere. The primary fluid inlets could also connect the first flue 17 to flue gas outlets of any power plants (not shown) located in a proximity to the renewable-energy power plant 1. I.e., waste heat from other power plants could be diverted into the first flue 17, thus increasing the efficiency of the power generation of the renewable-energy power plant 1. The first flue 17 extends from the primary fluid inlets 19 and upwards towards the roof portion 7 of the first structure 3. Adjacent to the roof portion 7, a top portion 27 of the first flue 17 is provided. The top portion 27 of the first flue 17 is the space between the uppermost portion of the second structure 9 and the roof portion 7 of the first structure 3. The inner surface 6 of the first structure 3 is provided with a curved portion 29 adjacent to the roof portion 7 of the first structure 3, such that a transition between the vertically oriented walls of the first structure 3 and the inner surface 14 of the roof portion 7 is smooth and frictional losses are thereby reduced. Furthermore, the roof portion 7 is provided with a centrally arranged funnel 31 which connects the space 12 provided inside the roof portion 7 with the top portion 27 of the first flue 17. The convex outer surface 10 of the roof portion 7 is also provided with a one-way valve 49 that allows a working fluid to enter the space 12 inside the roof portion 7 from an ambient atmosphere, but which prevents the air held inside the space 12 from leaving through any other exit than the funnel 31. The convex surface 10 is transparent to radiant energy, and can for example be made of glass, a transparent polymer, or a steel-reinforced glass or polymer structure. Thus, the air held in the space 12 of the roof portion 7 is heated by the sun, thus causing the pressure inside the space 12 to increase and the air to be forced out into the top portion 27 of the first flue 17. Once a sufficient under-pressure has been achieved inside the space 12, more air enters the space 12 through the one-way valve 49.

The second structure 9 has an open top and a second flue 33 is thereby provided therein. The second flue 33 extends from the open top, which defines a secondary fluid inlet 21, and downwards towards a lower portion of the second structure 9. Thus, the second flue 33 is defined by the secondary fluid inlet 21 and the hourglass-shaped inner surface 13 of the second structure. The hourglass-shaped inner surface 13 is provided with a first vertical upper portion 35, a second curved portion 37, a third vertical waist portion 39, and a fourth curved portion 41. The abovementioned portions of the inner surface 13 are sequentially aligned with the first vertical upper portion 35 being arranged in the topmost position, and the fourth curved portion 41 being arranged at the lowest position. The second curved portion 37 is arranged so that the cross-sectional area of the second flue 33 is lower at a position just below the second curved portion 37 than at a position just above it. The transition between the second curved portion 37 and the first vertical upper portion 35 and the third vertical waist portion 39, respectively, is smooth. I.e. the tangent of the second curved portion 37 is substantially parallel with the tangent of the respective portion of the inner surface 13 at a location at which they connect to each other. The transition between the fourth curved portion 41 and the third vertical waist portion 39 is not smooth, i.e. the rate of change in cross-sectional area changes abruptly when transitioning from the third vertical waist portion 39 to the fourth curved portion 41.

The second structure 9 is further provided with a sprinkler system 53, which is arranged to discharge a fluid into the second flue 33 and onto the working fluid passing therethrough. The temperature of the working fluid can thereby be decreased and the density of the working fluid increased. The sprinkler system 53 is arranged as a plurality of concentric circular tubes 55, each provided with a plurality of vertically oriented discharge nozzles 57. The discharge nozzles are provided with openings (not shown) through which a fluid may be discharged. The renewable-energy power plant is further provided with a reservoir (59 in FIG. 3) which holds the fluid that is to be discharged by the sprinkler system 53. The reservoir 59 is connected to the constricted portion 23 of the first flue 17 by means of a first channel 61. The first channel 61 is arranged such that the constricted portion 23 creates an under-pressure inside the reservoir 59 when a fluid passes therethrough at an increased velocity. When the pressure decreases inside the reservoir 59, the boiling point of the fluid held therein decreases and a portion of the fluid evaporates. The first channel 61 is provided with a membrane 62 which prevents this steam from passing through the channel 61. As the fluid in the reservoir 59 evaporates, the temperature of the fluid decreases. The steam created in this way is discharged from the reservoir 59 through a one-way valve 63 arranged to allow steam to exit the reservoir 59 while preventing air from an ambient atmosphere from entering. The fluid held in the reservoir 59, after having been cooled by under-pressure evaporation, is transported through a second channel 65 by means of a pump (not shown) to the sprinkler system 53 where the fluid is discharged into the second flue 33 and onto the working fluid flowing therethrough.

As this inner surface 13 is hourglass-shaped, the second flue 33 has a cross-sectional area that decreases locally over a middle portion of the second flue 33. Thus, the cross-sectional area of the second flue 33 is larger at both the top portion of the second flue 33 and at the lower portion than at the middle portion. Thereby, the second flue 33 is arranged to cause a fluid that flows therethrough to flow at a higher velocity at the middle portion of the second flue 33.

Adjacent to the transition between the second curved portion 37 and the third vertical waist portion 39, the inner surface 13 of the second structure 9 is provided with a tertiary fluid inlet 43 that connects the portion of the second flue 33 that has a decreased cross-sectional area with the ambient atmosphere. The tertiary fluid inlet 43 is provided with an inlet channel 45 (not shown in FIG. 1, shown in FIG. 2) which extends from an ambient atmosphere to the second flue 33. The inlet channel 45 is arranged to connect the second flue 33 with a high altitude ambient atmosphere, thus allowing relatively colder air from outside the renewable-energy power plant to be taken from the ambient atmosphere and added to the air which flows in a downward direction inside the second flue 33. As the second flue 33 is arranged so that the fluid velocity will be locally increased adjacent to the tertiary fluid inlet 43, an under-pressure will be created there. Thus, additional air from the ambient atmosphere is caused to flow into the second flue 33 from outside the renewable-energy power plant 1, thus causing the total amount of air flowing through the second flue 33 to increase.

Figure 2:
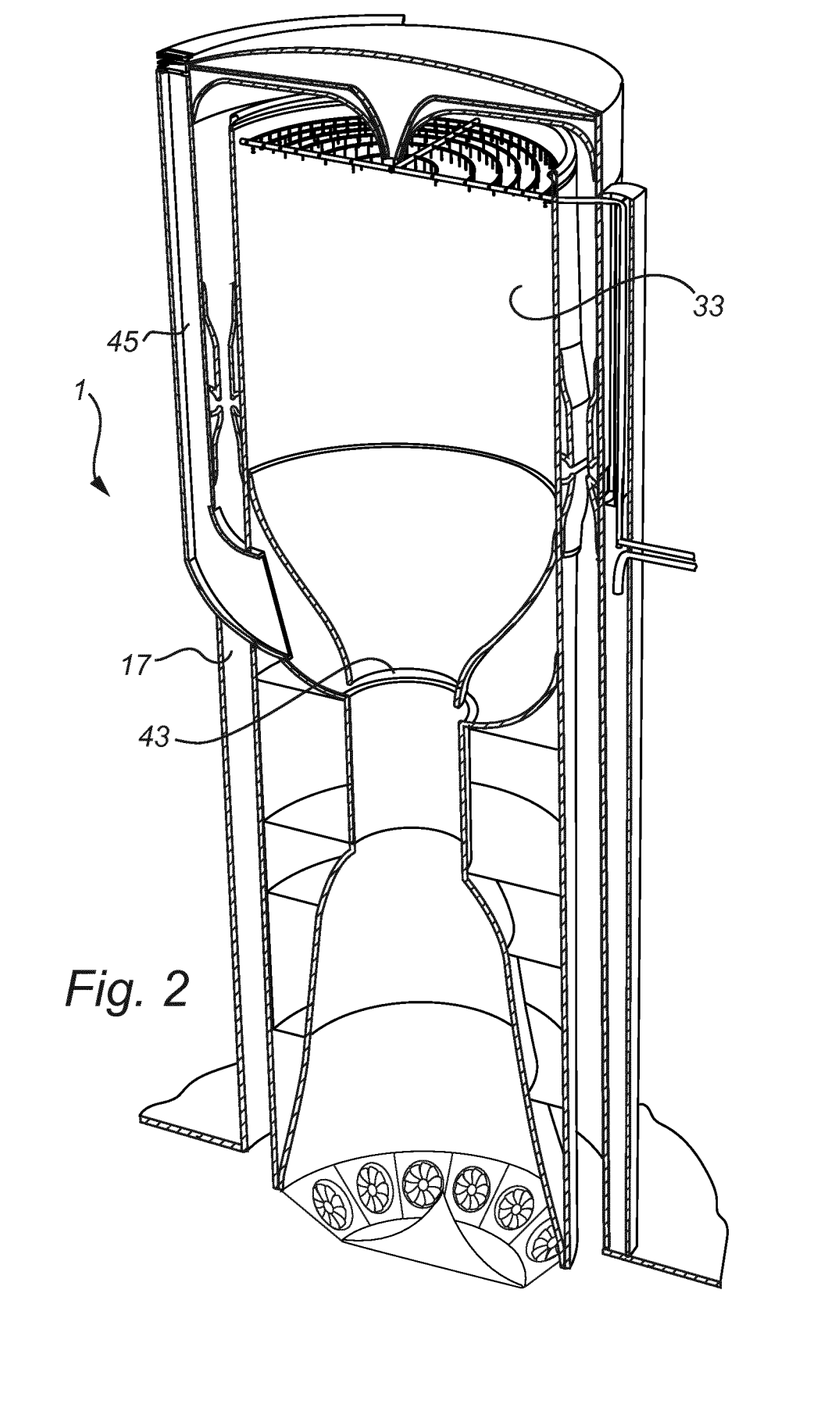
FIG. 2 is a perspective view of another cross-section of the renewable-energy power plant of FIG. 1.

The second structure 9 is further provided with a primary fluid outlet 47 located at the bottom of the second structure 9. The primary fluid outlet 47 extends outwards in a radial direction from the second flue 33 and connects the second flue 33 with the low altitude ambient atmosphere. Inside the primary fluid outlet 47, a plurality of turbine arrangements 49 are provided. The turbine arrangements 49 are arranged to generate power due to air flowing in a downward direction in the second flue 33 and being forced out through the primary fluid outlet 47 as more air enters the second flue 33 from above. The amount of energy generated in this way is proportional to the mass and velocity of the fluid flowing through the second flue 33. The second structure 9 is further provided with a fluid director 51, which is shaped as a cone with concave lateral surfaces. The fluid director 51 is located at the bottom of the second structure 9, and is arranged so that a working fluid flowing downwards through the second flue 33 is caused to smoothly change direction so that it is guided towards the primary fluid outlet 47. Thus, frictional losses are decreased. FIG. 2 is a perspective view of another cross-section of the renewable-energy power plant 1 of FIG. 1.

Figure 3:
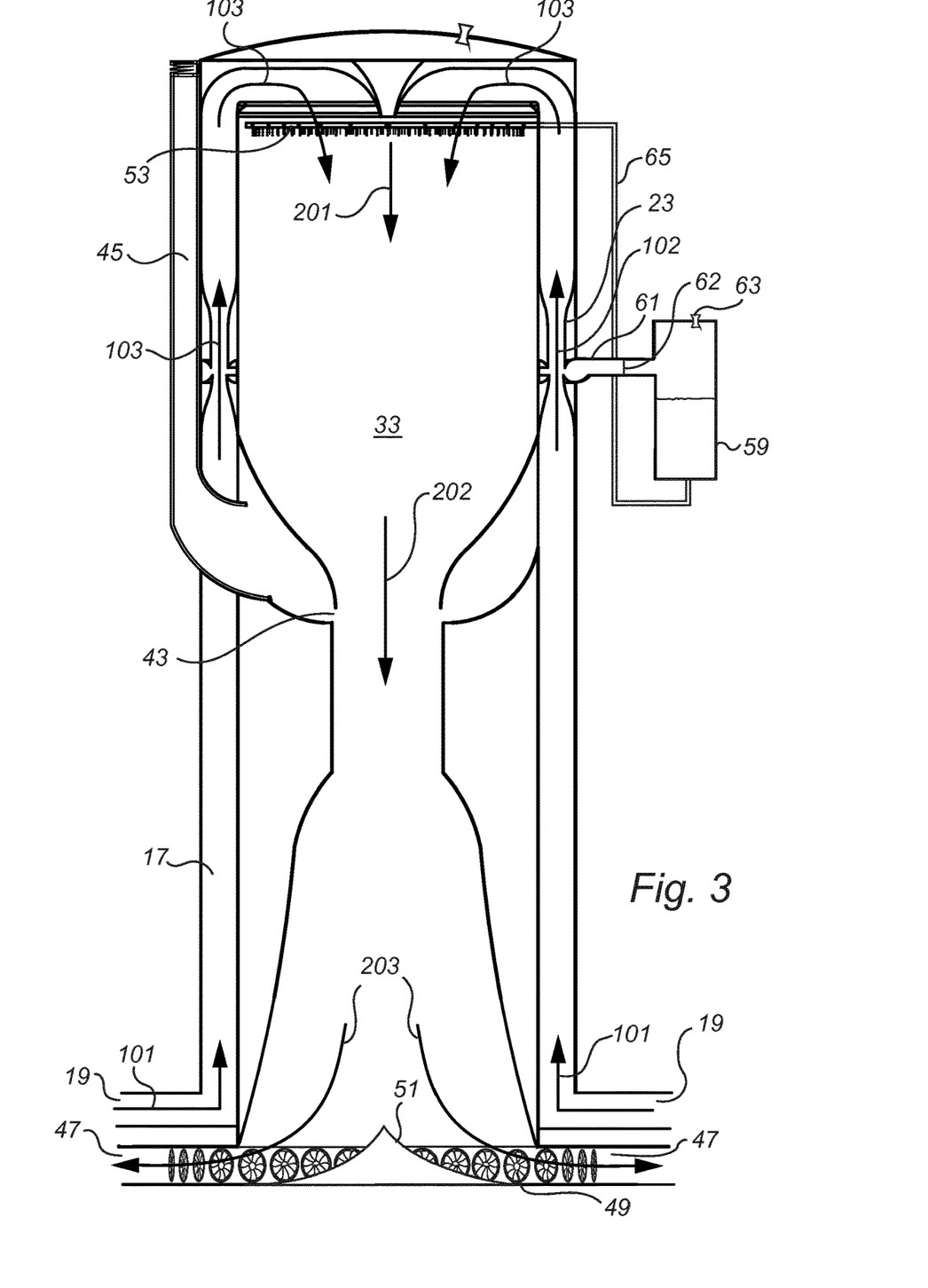
FIG. 3 is a schematic side view of a cross-section of a renewable-energy power plant according to an exemplary embodiment of the present invention.

FIG. 3 is a schematic side view of a cross-section of a renewable-energy power plant according to an exemplary embodiment of the present invention. The flow of the working fluid will now be explained with reference to a number of arrows indicating different portion of the flow path of the working fluid. A first arrow 101 indicates where the working fluid enters the primary fluid inlet 19 from a low altitude ambient atmosphere. The working fluid then rises due to it being heated by the sun. A second arrow 102 indicates where the velocity of the working fluid increases due to a decreased cross-sectional area of the first flue 17. This created a low-pressure area which is used to cool the fluid held in the reservoir 59, as described above. A third arrow 103 indicates where the working fluid is guided from flowing upwards in the first flue 17 towards entering a second flue 33. A fourth arrow 201 shows the working fluid in the second flue 33 just after it has been subjected to being wetted by the sprinkler system 53. Thus, the working fluid is cooled and humidified at the fourth arrow 201, and its density is therefore increased. Due to the working fluid having an increased density, it flows downwards. A fifth arrow 202 shows where the working fluid is caused to flow at an increased velocity due to the hourglass-shaped second flue 33. Thus causes another low-pressure area to be created, this one being arranged such that additional working fluid is taken from the high altitude ambient atmosphere, through the tertiary fluid inlet 43, and into the second flue 33. A sixth arrow 203 shows where the working fluid is guided towards the primary fluid outlet 47 and through the turbine arrangements 49, thus causing power to be generated.

Furthermore, any reference signs in the claims should not be construed as limiting the scope.

The invention claimed is:

1. A renewable-energy power plant comprising a first structure, a second structure, a first flue, a second flue and a turbine arrangement comprising at least one turbine,
   wherein said first structure comprises a primary fluid inlet and said second structure comprises a secondary fluid inlet and a primary fluid outlet, wherein said secondary fluid inlet is connected to said first flue, wherein said primary fluid inlet is located lower than said secondary fluid inlet and said primary fluid outlet is located lower than said secondary fluid inlet,
   wherein said first flue is at least partly defined by said first structure, wherein said second flue is at least partly defined by said second structure,
   wherein said first flue extends from said primary fluid inlet to said secondary fluid inlet for guiding a working fluid from said primary fluid inlet to said secondary fluid inlet,
   wherein said second flue extends from said secondary fluid inlet to said primary fluid outlet for guiding said working fluid from said secondary fluid inlet to said primary fluid outlet,
   wherein said second flue has a cross-sectional area that decreases from an upper portion of said second flue towards an intermediate portion of said second flue, and wherein said cross-sectional area of said second flue increases from said intermediate portion of said second flue towards a lower portion of said second flue,
   wherein said second flue comprises at least one tertiary fluid inlet located adjacent to said intermediate portion of said second flue, wherein said at least one tertiary fluid inlet is arranged to allow a fluid to enter said second flue from outside said first structure,
   wherein said turbine arrangement is provided inside said second flue,
   wherein said power plant further comprises wetting means arranged to discharge an additive fluid to said working fluid passing through said secondary fluid inlet,
   wherein said additive fluid has a higher density than said working fluid,
   wherein said turbine arrangement is arranged to generate power due to said working fluid flowing in a downwards direction inside said second flue and passing through said turbine arrangement.

2. A renewable-energy power plant according to claim 1, wherein at least part of said first flue is collectively defined by said first structure and said second structure.

3. A renewable-energy power plant according to claim 1, wherein said first structure is substantially shaped as a vertically oriented cylinder and wherein a longitudinal axis of said second flue is substantially parallel with the gravitational direction.

4. A renewable-energy power plant according to claim 1, wherein said turbine arrangement is provided adjacent to said primary fluid outlet.

5. A renewable-energy power plant according to claim 1, wherein said primary fluid inlet is connected to ambient atmosphere.

6. A renewable-energy power plant according to claim 1, wherein said second structure comprises a fluid director located in said lower region of said second flue, wherein said fluid director is arranged to direct said working fluid from said intermediate portion of said second flue towards said primary fluid outlet.

7. A renewable-energy power plant according to claim 1, wherein said second structure comprises means for thermal insulation of said second flue from said first flue.

8. A renewable-energy power plant according to claim 1, wherein a height difference between said secondary fluid inlet and said primary fluid outlet is at least 400 m.

9. A renewable-energy power plant according to claim 1, wherein an outer wall of said first structure is made of a transparent material.

10. A renewable-energy power plant according to claim 9, wherein an outer wall of said second structure is provided with means for increasing the effectiveness of absorbing radiant heat.

11. A renewable-energy power plant according to claim 1, wherein said renewable-energy power plant further comprises a roof structure comprising a transparent portion, wherein said roof structure and said first structure collectively define a heating space, wherein said roof structure comprises a fourth fluid inlet connecting said heating space to ambient air, and wherein said first structure further comprises a fifth fluid inlet connecting said heating space to said first flue.

12. A renewable-energy power plant according to claim 1, wherein said power plant comprises a container for holding said additive fluid and said first flue comprises a constricted portion, wherein said container is connected to said constricted portion and arranged so that an under-pressure in said constricted portion causes a pressure in said container to drop.

* * * * *